(12) United States Patent
Rettig

(10) Patent No.: US 7,069,812 B1
(45) Date of Patent: Jul. 4, 2006

(54) HANDLEBAR HEIGHT ADJUSTMENT ASSEMBLY

(75) Inventor: Dirk J. Rettig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 78 days.

(21) Appl. No.: 10/615,071

(22) Filed: Jul. 8, 2003

(51) Int. Cl.
*B62K 21/12* (2006.01)

(52) U.S. Cl. .................................. 74/551.1; 280/279

(58) Field of Classification Search ............... 74/551.1, 74/551.3, 567, 569; 280/279, 280; B62K 21/02
See application file for complete search history.

(56) References Cited

U.S. PATENT DOCUMENTS

| | | | |
|---|---|---|---|
| 4,390,300 A | | 6/1983 | Foster |
| 4,410,197 A | | 10/1983 | St. Hillaire |
| 5,197,349 A | | 3/1993 | Herman |
| 5,201,244 A | | 4/1993 | Stewart et al. |
| 5,373,757 A | | 12/1994 | Bigall |
| 5,615,585 A | * | 4/1997 | Chi ............................ 74/551.1 |
| 5,680,798 A | | 10/1997 | Luen |
| 5,737,974 A | | 4/1998 | Chen |
| 5,775,709 A | | 7/1998 | Chen |
| 6,167,780 B1 | * | 1/2001 | Chen .......................... 74/551.1 |
| 6,892,604 B1 | * | 5/2005 | Tison et al. ................. 74/551.1 |
| 2003/0110880 A1 | * | 6/2003 | Tison et al. ................. 74/551.8 |

FOREIGN PATENT DOCUMENTS

| | | | | |
|---|---|---|---|---|
| CA | 2 428 32 | * | 11/2004 | ................ 74/551.1 |
| DE | 199 40 969 A1 | * | 11/2000 | ................ 74/551.1 |
| FR | 2379423 | * | 9/1978 | ................ 74/551.1 |
| JP | 2003-127957 | * | 5/2003 | ................ 74/551.1 |
| WO | WO 2004/031027 A1 | * | 4/2004 | ................ 74/551.1 |

OTHER PUBLICATIONS

Translation of German/French Patent Document No. 19,940,969 A1 of Scientific Library of PTO (PTO 2003-4670).*
Title: Physics, Parts I and II, Authors: David Halliday and Robert Resnick, Publisher: John Wiley & Sons, Inc., 1967, pp. 109-116.*

* cited by examiner

*Primary Examiner*—Vinh T. Luong
(74) *Attorney, Agent, or Firm*—Boyle Fredrickson Newholm Stein & Gratz, S.C.

(57) ABSTRACT

A height adjustment assembly for a handlebar stem secured to a steer tube of a bicycle is provided. The assembly includes a pair of spacers securable to the steer tube on opposite sides of the handlebar stem that each include a pair of rings engageable with one another to form the spacers. Each ring includes a number of tabs having locking members thereon that are engageable with the locking members on the tabs of the opposed ring of each spacer. By rotating the rings of each spacer with regard to one another, the height of each spacer and the gap between the spacers can be moved upwardly or downwardly along the steer tube to enable the stem to be positioned between the spacers on the steer tube at the desired height.

11 Claims, 3 Drawing Sheets

HANDLEBAR HEIGHT ADJUSTMENT ASSEMBLY

FIELD OF THE INVENTION

The present invention relates to bicycles, and more specifically to an assembly for adjusting the height of a handlebar stem secured to the bicycle.

BACKGROUND OF THE INVENTION

In order to fit a bicycle to a particular rider, various parts of the bicycle must be moved with respect to the bicycle frame. Specifically, the seat and handlebars of the bicycle must be adjusted to position the rider on the bicycle where the seat, peddles and handlebar are all comfortably positioned with regard to the rider.

In order to adjust a handlebar stem with regard to the bicycle frame, often times various components of the neck assembly holding the handlebar stem on the bicycle frame must be disengaged and/or repositioned in order to locate the stem at the desired location for a particular rider. In most bicycle construction, the neck assembly is formed of a steel tube, extending upwardly from a front bicycle fork that is inserted through and rotatably retained within a head tube on the bicycle frame. The handlebar stem is positioned above the head tube and held on the tube by a pair of spacers located on the stem tube on the tube above the stem and between the head tube and the handlebar stem. Based on the construction of the majority of these prior art neck assemblies, the repositioning of the components of the assemblies to adjust the handlebar stem often requires that one or both of the spacers attached to the steer tube on opposite sides of the bicycle stem must be removed and replaced with spacers having a different size, and/or that the steer tube on the bicycle frame must be cut to the necessary length.

In either case, the time and materials required to reposition the handlebar stem on the steer tube for the bicycle frame are very significant. Further, if an individual or shop does not have the spacers of the necessary size or thickness, or cannot cut the steer tube to the desired length, it is not possible to reposition the handlebar stem where desired. Also, in those situations where the tube is cut, it will not be possible to readjust the stem back to the previous location as that part of the tube has been permanently removed.

Therefore, it is desirable to provide a handlebar stem adjustment assembly which allows for quick and easy repositioning of a handlebar stem on a steer tube without having to replace any components of the assembly or having to alter the structure of the bicycle frame. Further, the stem height adjustment assembly should have a strong and durable construction capable of withstanding the forces applied to the mechanism by the relative movement of the handlebar stem and the steer tube during normal operation of the bicycle.

SUMMARY OF THE INVENTION

The present invention is a height adjustment assembly for a handlebar stem that includes a pair of adjustable spacers disposed on opposite sides of a handlebar stem and attached around a steer tube. The spacers are each formed of a generally rigid material and each spacer includes an upper member and lower member positioned in an inverted relationship with regard to each other around the steer tube. Both the upper member and lower member of each spacer are formed to have a number of outwardly extending tabs positioned on the upper and lower members, with each tab including a number of locking teeth extending along the length of the tab.

The upper and lower members of each spacer each also define a central opening through which the steer tube can be inserted such that the spacers can easily be positioned around the steer tube on opposite sides of the handlebar stem. To effectively hold the handlebar on the steer tube, the spacers are fixed in position by securing one of the upper or lower members of each spacer to the steer tube in order to maintain the spacers on the bicycle and the handlebar between the spacers.

To adjust the height of a handlebar stem fixed between the spacers on the steer tube, initially the handlebar stem is disassembled and removed from between the spacers on the steer tube. After the stem is removed, the upper or lower member of each spacer which is not fixed to the steer tube is disengaged from the remaining fixed upper or lower member of each spacer and rotated around the steer tube with respect to the fixed spacer member. By rotating the non-fixed member, the alignment of the tabs on the upper and lower members is altered to increase or decrease the overall width of each spacer. However, regardless of the amount of adjustment of the spacers, the overall length of the assembly remains static as the uppermost and lowermost members are fixed to the steer tube. Also, the distance between the spacers is maintained by adjusting each of the non-fixed spacer members the same amount such that the stem, when reaffixed around the steer tube between the spacers, does not have room to slide upwardly or downwardly with regard to the steer tube. Once the movable members of each spacer are repositioned where desired to move the handlebar up or down the steer tube, the stem is reattached to the steer tube between the spacers at the desired height.

Objects of the present invention include providing a stem height adjustment assembly that: has a limited number of pieces which each have a rigid and durable construction; is easy to manipulate in order to vary the width of each spacer in the assembly to reposition the handlebar stem on the steer tube; and includes a reliable and easy to disengage locking mechanism to hold the spacers in the desired configuration on the steer tube during the operation of the bicycle.

Numerous other objects, features and advantages of the present invention will become apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
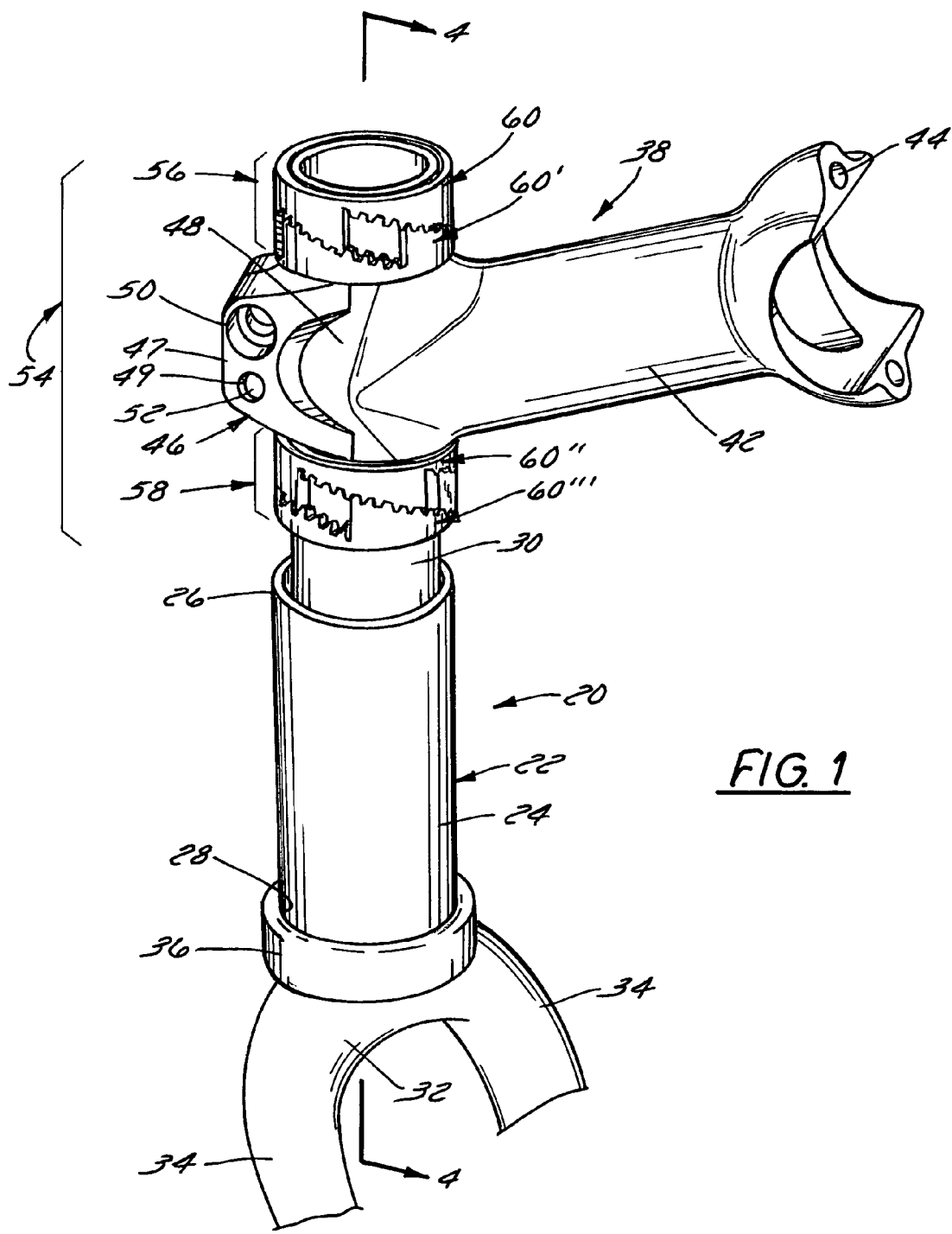
FIG. 1 is an isometric view of a handlebar stem positioned on a steer tube using the handlebar height adjustment assembly of the present invention.

With reference now to the drawing figures in which like reference numerals designate like parts throughout the disclosure, a bicycle frame is illustrated in part at 20 in FIG. 1. The part of the bicycle frame 20 shown is a front end 22 and includes a sleeve or head tube 24, having an upper end 26 and a lower end 28, through which is inserted a steer tube 30 of a wheel fork 32. The fork 32 includes a pair of arms 34 that are secured opposite the steer tube 30 to one of a pair of wheels (not shown) in any conventional manner. Further, the steer tube 30 is secured within the sleeve 24 by conventional bearing mechanisms 36 positioned at the upper end 26 and lower end 28 of the sleeve 24 which enable the steer tube 30, fork 32 and wheel to pivot with regard to the sleeve 24 and bicycle frame 20.

In order to control the pivoting of the steer tube 30 and wheel with regard to the frame 20, the steer tube 30 is connected to a handlebar assembly 38 opposite the wheel fork 32. The handlebar assembly 38 includes a handlebar (not shown) that is fixed to the steer tube 30 for rotation therewith by a stem 42. The stem 42 includes a first end 44 that is securable around the handlebar, and a second end 46 having a first portion 47 and a second portion 48 secured to one another around the tube 30 above the sleeve 28 to attach the stem 42 to the tube 30. The first portion 47 and second portion 48 include alignable openings 49 and 50 that each receive a bolt 52 therein in order to releasably fix the second end 46 of the stem 42 to the steer tube 30.

Figure 4:
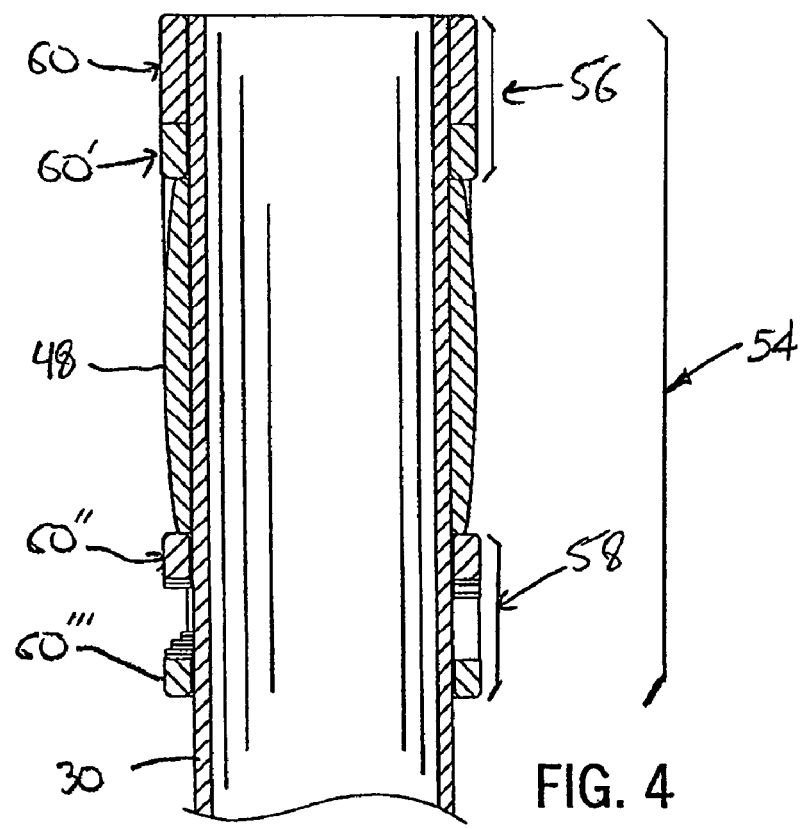
FIG. 4 is a cross-sectional view along line 4—4 of FIG. 1.
Figure 5:
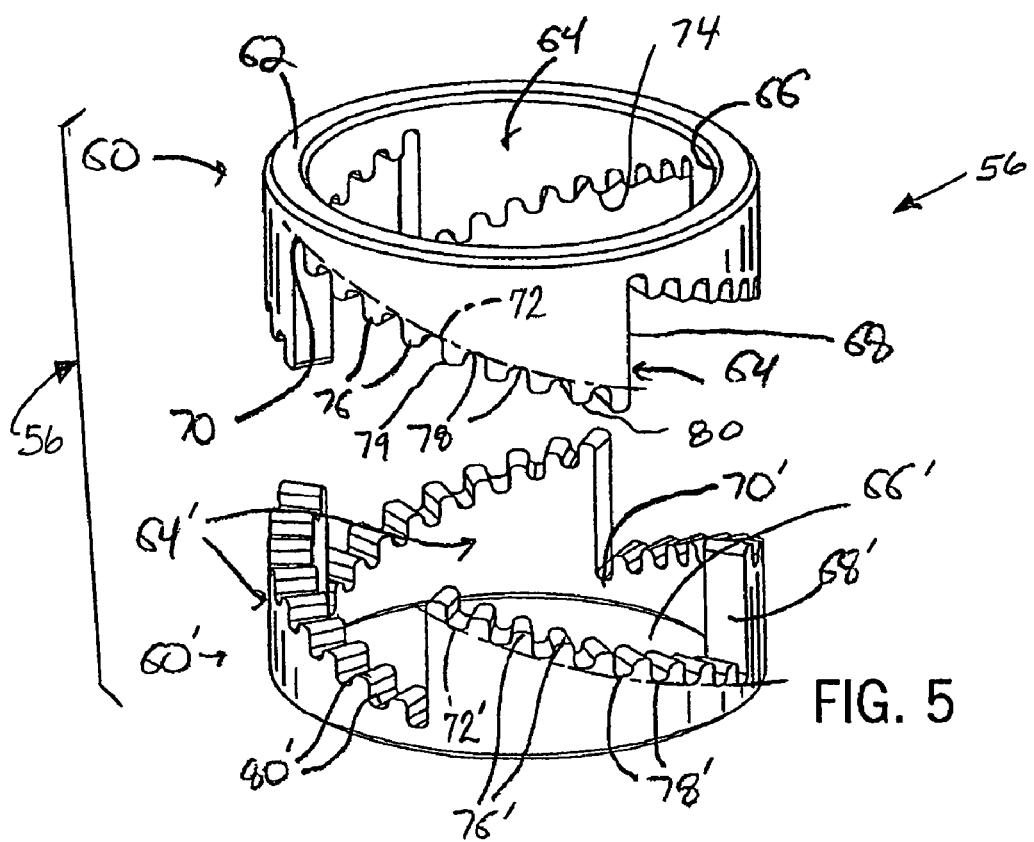
FIG. 5 is an isometric, exploded view of the assembly of FIG. 1.

Because the bolts 52 are not directly engaged with the steer tube 30, in order to maintain the position of the stem 42 on the steer tube 30 where desired, the bicycle frame 20 also includes a stem height adjustment assembly 54 positioned on the steer tube 30 around the stem 42. As best shown in FIGS. 1 and 4–5, the assembly 54 includes a first spacer 56 positioned between the stem 42 and the sleeve 28, and a second spacer 58 positioned against the stem 42 opposite the first spacer 56.

The first spacer 56 is formed of pair of rings 60 and 60', and second spacer 58 is formed of a pair of rings 60" and 60'''. The pair of rings 60 and 60' and the pair of rings 60" and 60''' are each positioned in an inverted relationship with regard to one another on opposite sides of the stem 42 to form the spacers 56 and 58, respectively. Each ring 60, 60', 60" and 60''' is formed of a generally rigid material, such as an injection molded plastic, or metal, and includes a generally circular base 62 and a number of tabs 64 extending outwardly from one side of the base 62. Each of the tabs 64 extends outwardly from the base 62 along or in conformance with the shape of the base 62 such that the tabs 64 do not obscure or narrow the diameter of a central opening 66, 66' defined by the base 62. Similarly, tabs 64' extend outwardly from the base 62' of ring 60', tabs 64" extend outwardly from the base 62" of ring 60", and tabs 64''' extend outwardly from the base 62''' of ring 60'''. Further, while the base 62 is generally circular in shape in order to conform to the shape of the steer tube 30, based on other possible configurations for the steer tube 30, such as a rectangular or other polygonal shape, the rings 60, 60', 60" and 60''' and base 62 can be formed as necessary to conform to the various shapes for a steer tube 30.

Looking particularly at FIG. 5, each of the tabs 64 has a wide end 68 and a narrow end 70 that both extend outwardly perpendicularly from the base 62 and are joined by a downwardly sloping surface 72. Similarly, rings 60', 60" and 60''' included tabs 64', 64" and 64''' having wide ends 68', 68", 68''' and narrow ends 70', 70", 70''', respectively. Further, the tabs 64 are positioned around the base 62 such that the narrow end 70 of each tab 64 is positioned immediately adjacent, and/or forms a part of the wide end 68 of an adjacent tab 64. While this is a preferred embodiment for the rings 60, 60', 60" and 60''', each of the tabs 64 can also be spaced from one another about the periphery of the base 62 in order to form rings 60, 60', 60" and 60''' having tabs 64 of various sizes and configurations to provide the desired range of adjustment for the assembly 54.

In order to enable the pair of rings 60 and 60' forming the first spacer 56 and the pair of rings 60" and 60''' forming the second spacer 58 to lockingly engage one another, each sloping surface 72 and 72' also includes a number of locking members 74 spaced along the length of the surface 72. In a preferred embodiment shown in FIG. 5, the locking members 74 take the form of rounded teeth 76, 76', 76" separated by complementary grooves 78, 78', 78''' forming a descending, step-like configuration along the length of the sloping surface 72. Further, while the teeth 76 and grooves 78 are shown as being generally rectangular in shape and having rounded engaging ends 79 and 80, 80' respectively, the shape of the teeth 76 and grooves 78 can be any desired shape that is capable of securely engaging a complementary shaped tooth or groove on the adjacent ring 60, 60', 60" and 60''' to prevent the rotation of the rings 60 with respect to ring 60', or to prevent rotation of ring 60" with respect to ring 60'''. The teeth 76 and grooves 78 are spaced along the entire length of the sloping surface 72 such that the respective rings 60, 60', 60" and 60''' forming each spacer 56 and 58 can be engaged with one another at a number of different locations along the entire length of the surface 72 of each tab 64, enabling the rings 60, 60', 60" and 60''' to be engaged with one another. As shown best in FIG. 2, the width (w) of the assembled rings 60 and 60' forming the first spacer 56, and similarly the width of the assembled rings 60" and 60" forming the second spacer 58, can be selected between the completely collapsed position of the first spacer 56 to an extended position of the second spacer 58. Thus, the stem 42 can be positioned between the spacers 56 and 58 at different heights based upon the various configurations for the rings 60 and 60' of spacer 56, or rings 60" and 60''' of spacer 58, from the completely collapsed position to the completely expanded position.

Figure 2:
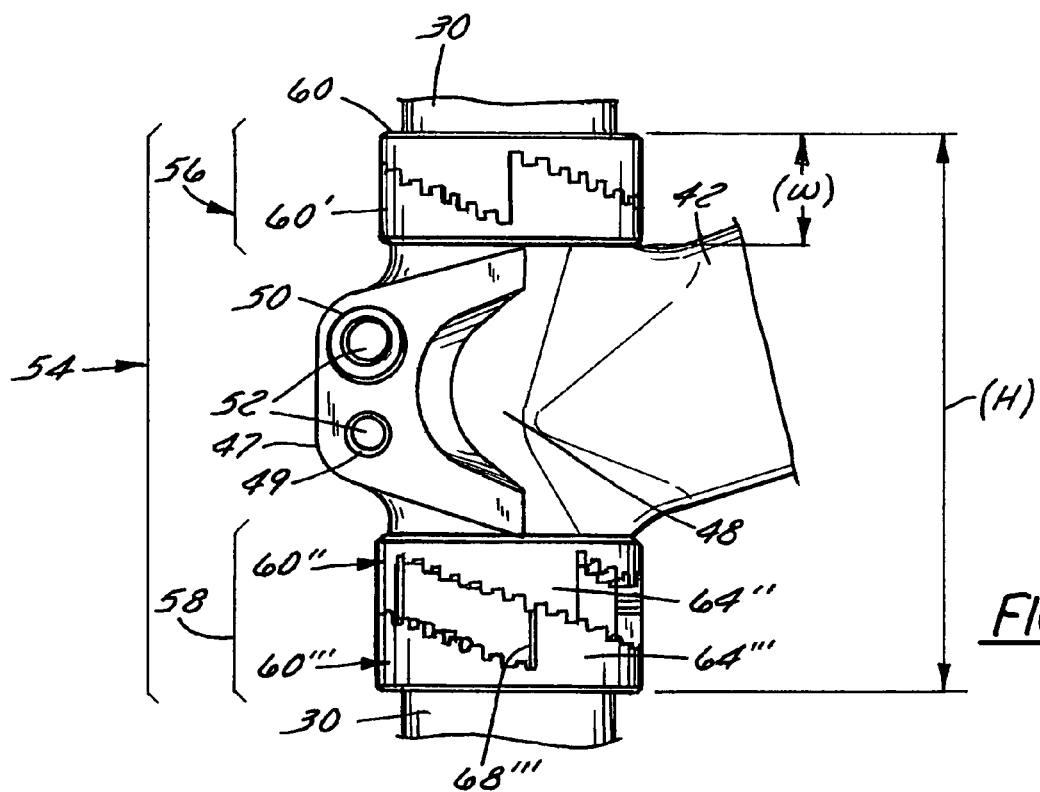
FIG. 2 is a partially broken away, isometric view of the assembly of FIG. 1 in a first position.
Figure 3:
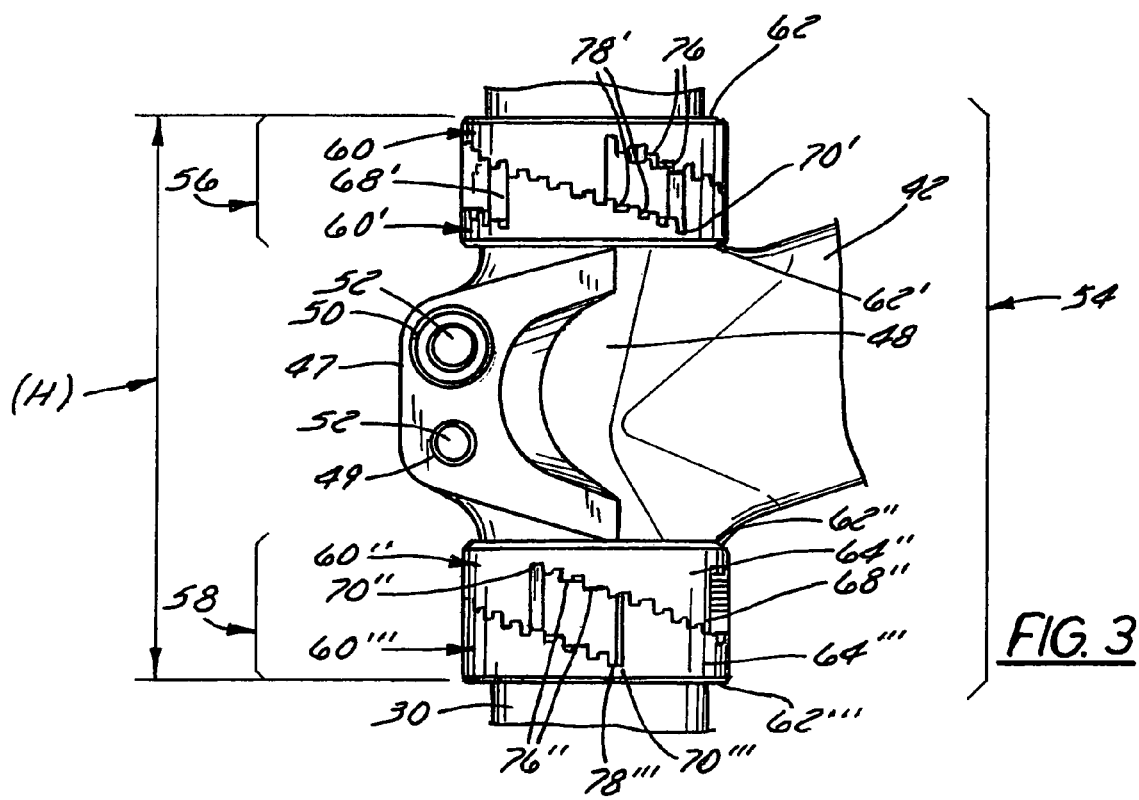
FIG. 3 is a partially broken away, isometric view of the assembly of FIG. 1 in a second position.

Also, because the uppermost ring 60 of the first spacer 56 and the lowermost rings 60''' of the second spacer 58 are fixed to the tube 30, the overall width of the assembly 54 does not change regardless of the configuration of the spacers 56 and 58. More specifically, as best shown in FIGS. 2 and 3, the overall height (H) of the assembly 54 is identical when the stem 42 is located in a centered position (FIG. 3) or when the stem 42 is located in an elevated position (FIG. 2). Thus, the assembly 54 can easily be utilized with steer tubes 30 having limited lengths for the attachment of the stem 42 in that the spacers 56 and 58 can be attached to the tube 30 to effectively limit the adjustment range for the stem 42 to the distances between the spacers 56 and 58.

In order to engage the assembly 54 on the steer tube 30, each of the rings 60 and 60' of spacer 56 and the rings 60" and 60''' forming the spacers 58, respectively, is positioned around the steer tube 30 above the head tube 28. To maintain the assembly 54 in the proper location, the upper ring 60 of the first spacer 56, and the lower ring 60''' of the second spacer 58 are fixed to the steer tube 30 in any conventional manner, such as by using an adhesive or by welding, depending upon the material used to form the rings 60 and 60'''. By securing the rings 60 and 60''' to the steer tube 30, the assembly 54 can be maintained on the steer tube 30 to keep the stem 42 from sliding along the tube 30 or to prevent the inadvertent disengagement of the stem 42 from the steer tube 30. Also, when securing the rings 60 and 60''' to the tube 30, an individual can set the height range of the assembly 54 for use with stems 42 of different sizes. Further, other spacing members (not shown), such as O-rings or sleeves, can be positioned between the spacers 56 and 58 on the assembly 54 to allow for a greater or lesser adjustment range within the assembly 54. Alternatively, the upper ring 60 of the first spacer 56, and the lower ring 60''' of the second spacer 58 can be integrally formed with the steer tube 30 in order to avoid any problems with inadvertent disengagement of the fixed rings 60 and 60''' from the steer tube 30 and failure of the assembly 54. In this alternative embodiment, the non-fixed rings 60' and 60'' are formed from separable sections (not shown) that can be assembled around the tube 30 between the integral rings 60 and 60''' to form the assembly 54.

Once the fixed rings 60 of spacer 56 and the fixed rings 60''' of spacer 58 are secured to the steer tube 30, the remaining non-fixed rings 60' and 60'' are positioned around the tube 30 between the fixed rings 60 and 60''' and can be rotated about the steer tube 30. The non-fixed rings 60' and 60''' are then positioned and engaged with the fixed rings 60 and 60''', respectively, to set the required gap between the respective spacers 56 and 58 for the attachment of the stem 42 therebetween to position the stem 42 at the desired height on the tube 30.

When it is desired adjust the height of the handlebar and stem 42 with regard to the bicycle frame 20, the first portion 47 and second portion 48 of the second end 46 of the stem 42 are disengaged from one another by removing the bolts 52 in order to remove the stem 42 from the steer tube 30. Once the stem 42 is removed, the non-fixed rings 60' and 60'' of each spacer 56 and 58, respectively can be disengaged from, and rotated with respect to, the fixed rings 60 and 60''' in order to vary the widths of the first spacer 56 and second spacer 58, respectively. This consequently moves the gap defined between the first spacer 56 and second spacer 58 upwardly or downwardly with respect to the steer tube 30 to the desired location for the stem 42. Once the non-fixed rings 60' and 60'' are repositioned to configure the spacers 56 and 58, respectively, and the gap therebetween as desired, the second end 46 of the stem 42 can be reconnected to the steer tube 30 between the spacers 56 and 58 to maintain the stem 42 and handlebars at the selected location on the steer tube 30 during the operation of the bicycle 20.

In another embodiment of the assembly 54 of the present invention, the assembly 54 can be constructed with only one of the first spacer 56 or second spacer 58, and a separate positioning member (not shown) disposed on the tube 30 against the stem 42 opposite the spacer 56 or 58. Examples of suitable positioning members include O-rings, frictional sleeves, clamps, compression members and other mechanisms capable of being slidably mounted to the tube 30 and/or releasably engaged with the tube 30. When utilizing the positioning member in place of one of the spacers 56 or 58, the stem 42 does not need to be removed from the tube 30, as the positioning member can be slid along or removed from the tube 30 to provide additional room along the tube 30 to slide the stem 42 away from the remaining spacer 56 or 58 to enable the spacer to be adjusted in height using the fixed rings 60 and 60''' and non-fixed rings 60' and 60'', respectively in the manner discussed previously.

Various alternatives are contemplated as being within the scope of the following claims particularly pointing out and distinctly claiming the subject matter regarded as the invention.

I claim:

1. A height adjustment assembly for a bicycle handlebar stem that is positioned on a steer tube of a bicycle, the height adjustment assembly comprising:
    a) a first spacer secured to the steer tube on one side of the stein and including a first upper member and a first lower member, each of the first upper member and the first lower member including a base and a number of tabs extending outwardly from one side of the base, each of the number of tabs including a plurality of locking members positioned on the tab; and
    b) a second spacer secured to the steer tube on the opposite side of the stem, wherein the first upper member is rotatable with respect to the first lower member to selectively engage the locking members on the first upper member with the locking members on the first lower member in various configurations,
    wherein each of the tabs has a sloped surface extending from the upper end to the lower end, and
    wherein the plurality of locking members are disposed on the sloping surface.

2. The assembly of claim 1 wherein the base is generally circular in shape.

3. The assembly of claim 1 wherein the number of tabs is positioned in an abutting relationship with one another around the base.

4. The assembly of claim 1 wherein each of the number of tabs has an upper end and a lower end.

5. The assembly of claim 1 wherein the plurality of locking members are formed as a number of teeth extending from each of the number of tabs opposite the base.

6. The assembly of claim 5 further comprising a plurality of grooves disposed between adjacent pairs of the number of teeth.

7. The assembly of claim 1 wherein one of the first upper member or the first lower member is adapted to be fixedly attached to the steer tube.

8. The assembly of claim 1 wherein the second spacer is formed of a second upper member and a second lower member, each of the second upper member and the second lower member including a base and a number of tabs extending outwardly from one side of the base, each of the number of tabs including a plurality of locking members positioned on the tab.

9. The assembly of claim 8 wherein one of the second upper member and the second lower member is adapted to be fixedly attached to the steer tube.

10. The assembly of claim 1 wherein each of the plurality of locking members include rounded teeth with a groove therebetween to configured to receive one of the plurality of rounded teeth.

11. The assembly of claim 1 wherein the plurality of locking members are located in a stepped configuration on the sloped surface of each of the number of tabs.

* * * * *